United States Patent
Turner et al.

[11] Patent Number: 6,105,988
[45] Date of Patent: Aug. 22, 2000

[54] ADJUSTABLE SUSPENSION SYSTEM HAVING POSITIVE AND NEGATIVE SPRINGS

[75] Inventors: Paul H. Turner, Boulder, Colo.; Kevan L. Chu, Santa Cruz; Robert L. Cobene, II, San Jose, both of Calif.

[73] Assignee: RockShox, Inc., San Jose, Calif.

[21] Appl. No.: 09/018,747

[22] Filed: Feb. 4, 1998

Related U.S. Application Data

[60] Provisional application No. 60/052,707, Jul. 16, 1997.

[51] Int. Cl.⁷ ................................................. B62K 25/08
[52] U.S. Cl. .................. 280/276; 267/64.25; 267/64.26; 188/322.15; 188/319.1
[58] Field of Search ............................... 188/312, 319.1, 188/322.22, 322.15; 267/217, 64.25, 64.26, 226, 64.15; 280/276, 275, 277, 284, 285, 286

[56] References Cited

U.S. PATENT DOCUMENTS

| | | | |
|---|---|---|---|
| 2,934,332 | 4/1960 | Mercier | 267/226 |
| 3,687,438 | 8/1972 | Rickard | 267/226 |
| 4,795,009 | 1/1989 | Tanahashi et al. . | |
| 5,000,470 | 3/1991 | Kamler et al. . | |
| 5,088,705 | 2/1992 | Tsai . | |
| 5,284,352 | 2/1994 | Chen . | |
| 5,509,674 | 4/1996 | Browning . | |
| 5,509,675 | 4/1996 | Barnett . | |
| 5,538,276 | 7/1996 | Tullis . | |
| 5,580,075 | 12/1996 | Turner et al. . | |
| 5,634,653 | 6/1997 | Browning | 280/276 |
| 5,711,514 | 1/1998 | Lu . | |
| 5,725,226 | 3/1998 | Cabrerizo-Pariente . | |
| 5,775,677 | 7/1998 | Englund | 267/64.11 |
| 5,862,895 | 1/1999 | Ricard | 188/289 |

*Primary Examiner*—Brian L. Johnson
*Assistant Examiner*—Avraham H. Lerner
*Attorney, Agent, or Firm*—Skadden, Arps, Slate, Maegher & Flom LLP; David W. Hansen

[57] ABSTRACT

A suspension system having first and second elements telescopingly engaged and being biased apart by a positive spring, such biasing being counteracted by a negative spring. In one embodiment, the positive spring and negative spring are disposed in the first element, which is in the form of a tube, and separated by a damping system, and a damping piston is fixed with respect to the first element. In another embodiment in which the suspension system comprises two legs of a bicycle suspension fork, a positive spring is disposed in both legs, and a negative spring and damping system are disposed in separate legs. In another embodiment in which the suspension system comprises a rear shock absorber for a bicycle, the negative and positive springs are disposed in a first tubular element, and a damping system is disposed in a second tubular element. The positive and negative springs preferably comprise air or other gas springs, and the negative spring preferably performs the additional function of resisting top-out impacts.

8 Claims, 6 Drawing Sheets

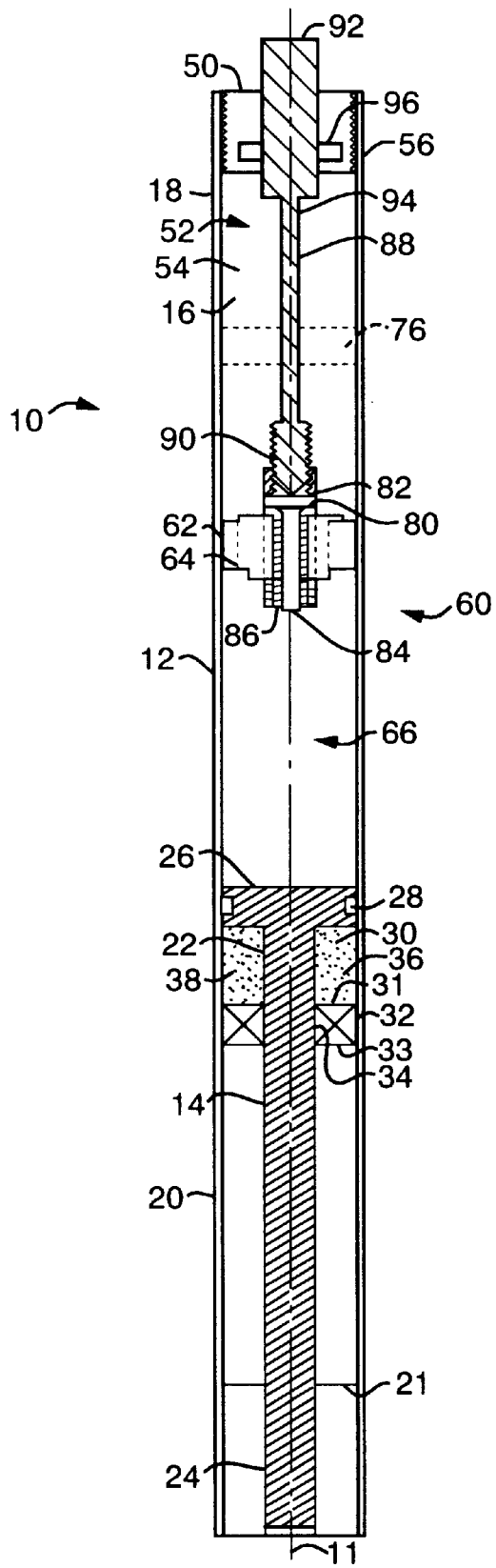
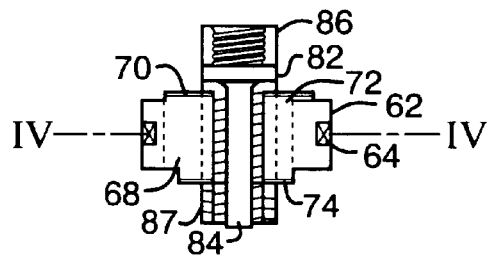
FIG. 4
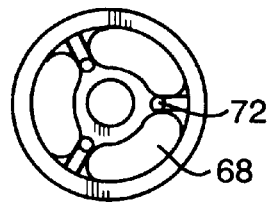
FIG. 5
FIG. 1

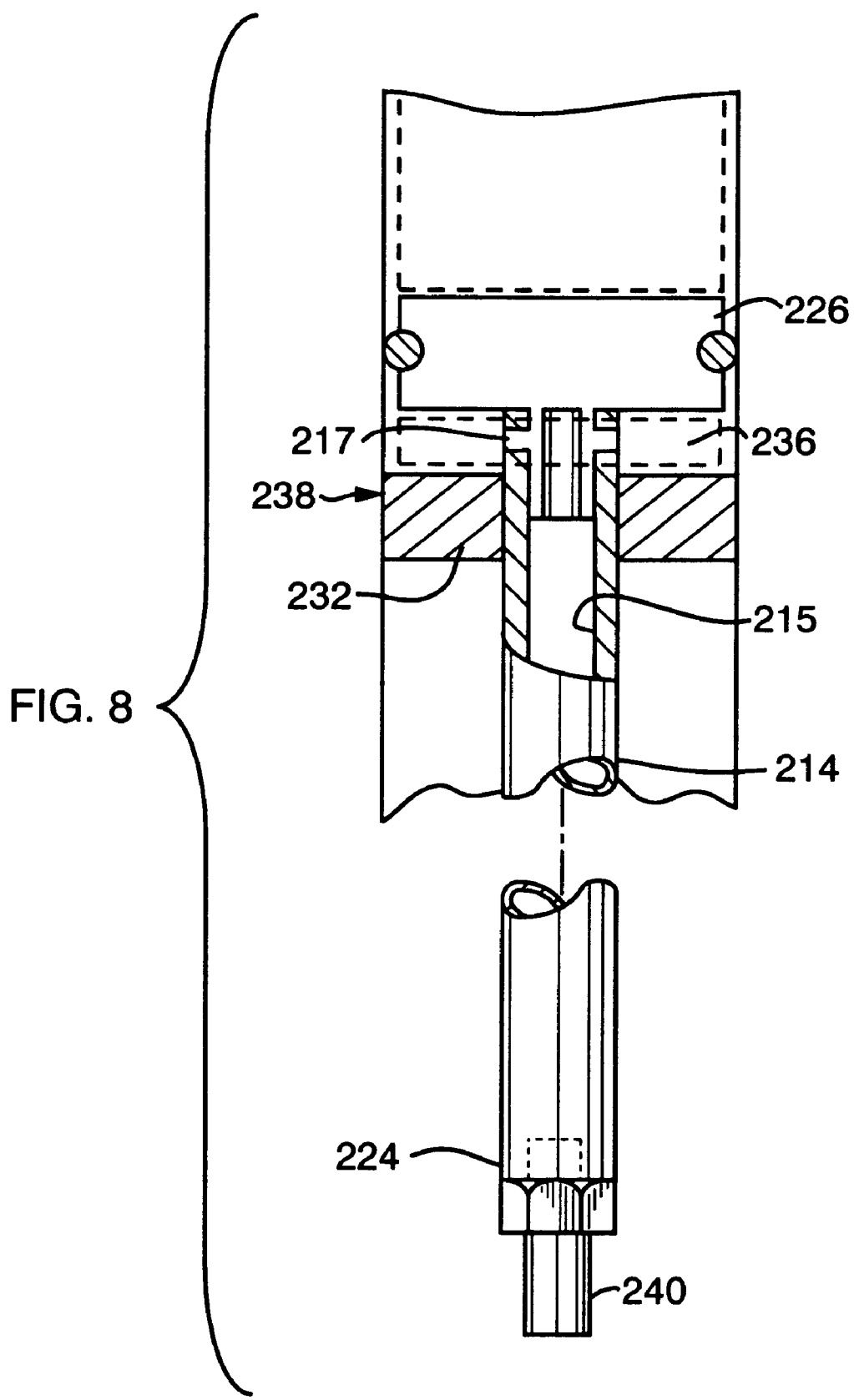

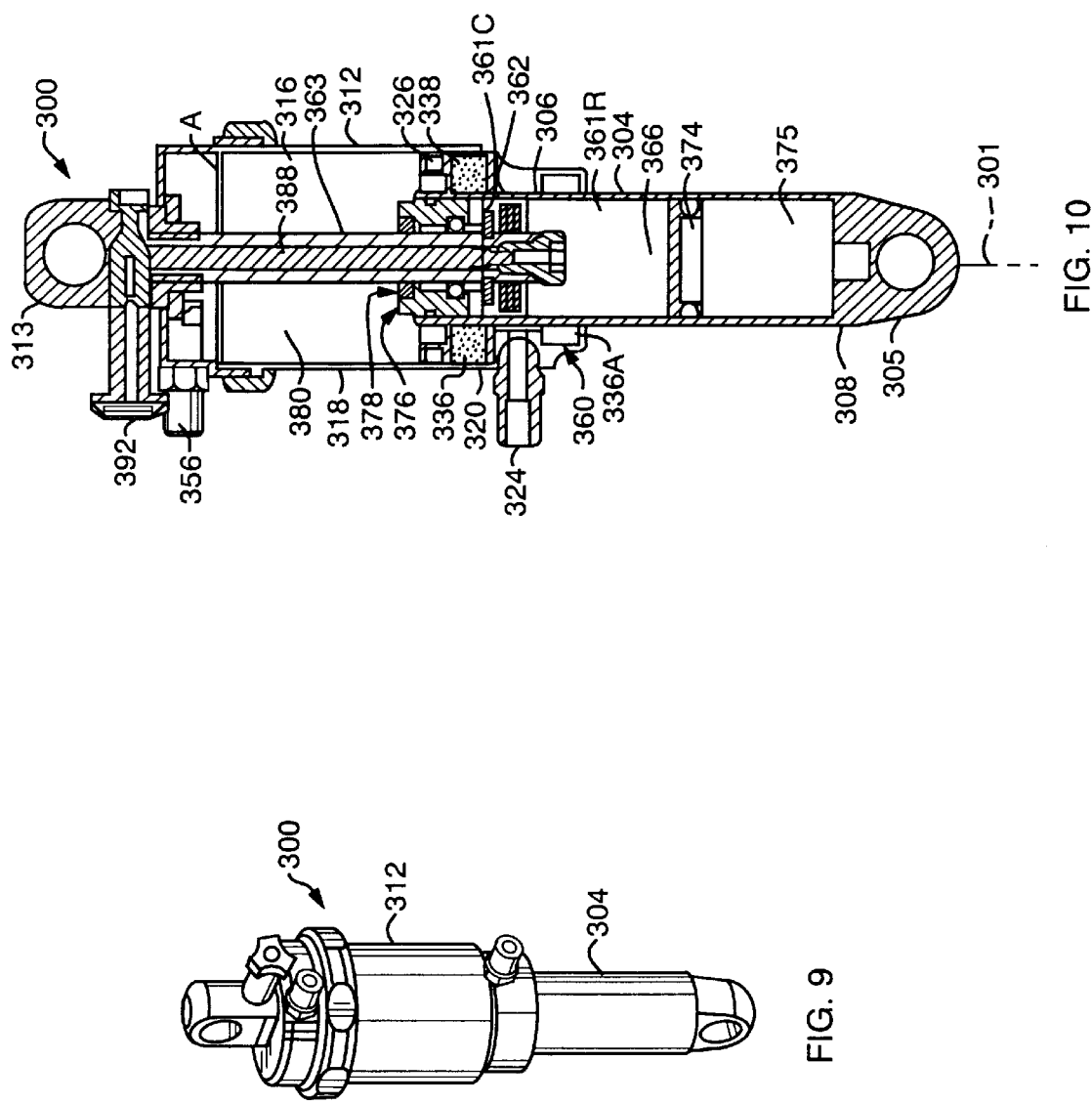

ADJUSTABLE SUSPENSION SYSTEM HAVING POSITIVE AND NEGATIVE SPRINGS

CROSS-REFERENCE TO RELATED PROVISIONAL APPLICATION

The present application claims the benefit of the earlier filing date of U.S. Provisional Patent Application Ser. No. 60/052,707, filed Jul. 16, 1997.

FIELD OF THE INVENTION

The present invention relates to a fully adjustable gas spring suspension system comprising both "positive" and "negative" springs. More particularly, the present invention relates to the use of a positive spring and a negative spring in a suspension system having two telescoping elements, the positive spring tending to bias the telescoping elements into a spaced-apart configuration and the negative spring tending to bias the telescoping elements together and to counteract the force of the positive spring.

BACKGROUND OF THE INVENTION

In the past, suspension systems in general have been used for many applications, including cushioning impacts, vibrations or other disturbances experienced by vehicles and machinery. Typical applications, for example, include the use of suspension systems in bicycles, motorcycles and all-terrain vehicles ("ATVs").

For example, bicycles have been developed with suspension systems for cushioning impacts or vibrations experienced by a rider when the bicycle contacts bumps, ruts, rocks, pot holes or other obstacles and road variations. Typically, such bicycle suspension systems have been configured for use in the front or rear bicycle fork, in the head tube that connects the front fork to the bicycle frame and handlebars, in the seat post, and in conjunction with a rear wheel swing-arm assembly, among other locations.

For example, locating bicycle suspension systems within bicycle forks has become increasingly popular. Bicycle suspension forks typically comprise at least one fork leg, and usually comprise two such legs, each leg including first and second telescoping tubular elements (an inner tubular element slidable within an outer tubular element). Typically, the inner tube is the upper tube and the outer tube is the lower tube, although the reverse may also be true. A resilient expansion biasing element, such as a spring, biases the tubular elements apart, but permits the inner tube to slide into the outer tube as necessary.

Bicycle fork suspension systems have often included expansion biasing elements such as coil springs, elastomer springs, arcuate spring discs, leaf springs, gas springs such as air springs, among other types of springs used for nominally biasing the tubular elements apart from one another and for absorbing compression forces applied to the forks as a result of impacts and vibrations experienced during operation of the bicycle. Using biasing elements in this way permits the tubular elements to compress in response to an impact or other force input, and expand or rebound once the force is removed, so that the first and second tubular elements return to their original spaced-apart positions relative to each other. Such bicycle suspension systems have also included expansion biasing elements in combination with damping devices such as hydraulic damping or friction damping mechanisms, which absorb some of the energy imparted to the bicycle by impacts or other force inputs causing compression or rebound of the tubular elements, thereby resisting movement of the tubular elements relative to each other.

One problem associated with prior suspension systems, and particularly with vehicle suspension systems such as those incorporated into bicycle suspension forks, is that they have been unnecessarily heavy. For example, the weight of a bicycle fork affects the handling of the bicycle, and adds to the overall weight of the bicycle, which the rider must work to propel and control. Reducing weight is therefore of great concern to all bicycle riders, and particularly to those involved in racing applications, where a reduction in weight offers an important competitive advantage. Accordingly, there is a need for suspension systems, and particularly for bicycle suspension systems, that are designed to be lightweight.

In the past, weight savings have been achieved in suspension systems such as bicycle suspension forks by using a gas spring as the expansive biasing element, instead of heavier biasing elements such as metal coil springs and the like. The resulting gas-sprung designs have suffered from disadvantages, however, including limited tunability of the suspension system's spring rate ("spring rate" may be defined as the amount of force required to compress or expand the suspension system a given distance) and, therefore, an inability to accommodate a wide variety of rider preferences. Consequently, there is a need for gas-sprung suspension systems, and particularly for gas-sprung bicycle suspension systems, that are designed to be fully tunable.

One adjustment feature that has been incorporated into gas-sprung suspension systems such as bicycle suspension forks is the ability to increase or decrease the gas pressure in the suspension system. In bicycle suspension forks as in other suspension systems, one problem associated with this adjustment feature is that an increase or decrease in the fork gas pressure results in a corresponding increase or decrease in the compressive force required to be applied to the fork before the first and second tubular elements will begin to compress in response to a bump or other force input (this force is commonly known as the "crack force"). Thus, depending upon the gas pressure in the gas spring, the suspension system may be undesirably stiff, and adequately responsive only to large inputs.

In gas-sprung bicycle suspension forks, for example, if the crack force is too large for a given rider, the fork will act much like a rigid, unsuspended fork in response to relatively small force inputs. If the crack force is too small, the fork tubes will compress easily and may sag extensively in response to the rider's weight, thus reducing their available compressive travel during use. Neither condition is desirable, and the wide range of potential rider weights and preferences makes the use of a pre-set or inadequately adjustable crack force problematic. Thus, there is a need for gas-sprung suspension systems, and particularly for gas-sprung suspension bicycle systems, that are designed to have an improved adjustment feature for adjusting the crack force of the system.

Particularly for bicycles, with respect to which weight is a constant concern, the ability to achieve multiple performance goals using a single system is highly attractive. Specifically, bicycle suspension systems require a "top-out" bumper for preventing impacts of the two tubular elements upon overexpansion, which typically occurs when the suspension system rebounds after a compression, or when the wheel of the suspended vehicle is lifted off the ground. Such impacts, which are particularly frequent for suspension systems used on mountain bikes, cause undesirable noise and may cause structural damage over time. In the past, various types of springs have been used to cushion top-out impacts. Gas springs, however, have not been used or recognized as being usable as top-out bumpers. As recognized by the present invention, however, the progressive spring rates and other features of gas springs give them a unique potential of providing a gradual, readily tunable resistance to top-out impacts. Accordingly, there is a need for gas-sprung suspension systems, and particularly for gas-sprung suspension bicycle systems, that integrate crack force and spring rate adjustment features with the ability to resist top-out impacts.

Typical suspension systems also frequently require a damping system. A typical damping system for use in a bicycle fork suspension system, for example, utilizes a valved piston and a damping fluid (or gas) which selectively passes through ports or apertures in the piston valves. Flow of the damping fluid through the piston valves, and thus damping, is controlled by the size of piston ports of the piston valve. The adjustability of damping characteristics, as well as reducing the weight of the damping system, have been ongoing concerns for suspension systems generally, and for bicycle suspension systems in particular. Accordingly, there is an ongoing need for suspension systems, and particularly for bicycle suspension systems, that are lightweight, yet which provide the above-described features, such as appropriate biasing, spring rate and crack force adjustability, and damping.

Accordingly, one object of the present invention is to provide a suspension system, and particularly a bicycle suspension system, that is lightweight.

Another object of the present invention is to provide a gas-sprung suspension system, particularly for gas-sprung bicycle suspension systems, that are fully tunable.

A further object of the present invention is to provide a gas-sprung suspension system, and particularly a gas-sprung bicycle suspension system, that has an improved adjustment feature for adjusting the crack force of the system.

Yet another object of the present invention is to provide a gas-sprung suspension system, and particularly a gas-sprung bicycle suspension system, that integrates crack force and spring rate adjustment features with a feature for resisting top-out impacts.

Yet another object of the present invention is to provide a bicycle suspension system, that is lightweight and provides appropriate biasing, spring rate and crack force adjustability, and damping.

SUMMARY OF THE INVENTION

The foregoing and other objects are accomplished by the present invention, which is directed to a suspension system (preferably embodied as a bicycle fork suspension system or other bicycle suspension system) to comprising two telescoping elements containing a positive spring and a negative spring that are adjustable. Both such springs are preferably air springs, but may comprise other types of gas springs, as well as coil, elastomer, or other types of springs. Together, the combination of positive and negative springs accomplished by the present invention provides a suspension system that is lightweight, that has highly tunable biasing, spring rate and crack force characteristics, and that integrates such tunability features with the ability to resist top-out impacts gradually and effectively.

One embodiment of the present invention is a suspension system in which a compressor piston is attached to one end of a piston rod and slides within a first tubular element. A first biasing element is positioned between the compressor piston and a closed second end of the first tubular element, tending to bias the compressor piston toward a first end of the first tubular element. A second biasing element is positioned between the first end of the first tubular element and the compressor piston, opposing the force exerted by the positive spring and tending to bias the compressor piston toward the closed second end of the first tubular element. Preferably, the first biasing element is an air or other gas spring, the compressor piston seals against the inner surface of the first tubular element to substantially separate the portions of the first tubular element containing the respective biasing elements, and the second end of the first tubular element is closed by a seal which, in combination with the compressor piston and the inner wall of the first tubular element, forms a substantially sealed air-tight chamber in which the first biasing element is disposed. In addition, the second biasing element is preferably an air or other gas spring disposed in a substantially air-tight chamber formed by the compressor piston, the inner wall of the first tubular element and a cap assembly sealing the first end of the first tubular element.

The suspension system may include a damping system, which may be (but need not necessarily be) disposed in the first tubular element. Preferably, the damping system is positioned between the compressor piston and the second biasing element, and comprises a damping piston fixed relative to the first tubular element, a damping fluid preferably disposed within a space defined by the compressor piston and the second biasing element, at least one port to permit the damping fluid to flow around or through the damping piston, and one or more flow control elements such as valves to control the flow of fluid through the port or ports. Fluid flow around or through the damping piston may be accomplished using a bleed valve system, which preferably comprises a bleed valve shaft, with at least one port therein, coupled to the damping piston. The bleed valve system may also be configured for permitting an adjuster shaft to extend therein to adjust the size of the bleed valve shaft port or ports. A floating piston may be used to separate the damping fluid from the second biasing element when that biasing element is made up, at least in part, of a gas spring.

The cap assembly of the first tubular element preferably has a valve, such as a Schrader or other gas valve, by which the gas spring of the second biasing element may be adjusted. The gas spring of the first biasing element is also preferably adjustable by providing a communication means between the gas spring and a valve, such as a Schrader or other gas valve, through the piston rod, which may be made hollow for this purpose.

A bicycle suspension fork or other bicycle suspension system may also comprise first and second fork legs, each fork leg comprising a first tubular element telescopingly slidable with respect to a second tubular element, such that the fork is compressible and expandable. Negative and positive springs may be provided in the manner discussed in connection with the previously described embodiment of the present invention. Preferably, a negative spring is positioned in only one of the fork legs, and a positive spring is positioned in at least one, and preferably both, fork legs. For example, the second fork leg may comprise a negative spring, and the first fork leg may comprise a positive spring. Preferably, however, the second fork leg comprises both positive and negative springs, and the first fork leg comprises only a positive spring. Also preferably, the first fork leg comprises a damping system.

The damping system of this embodiment may be positioned between the compressor piston and the positive spring as discussed in connection with the previous embodiment. Alternatively, the piston rod may be disposed within the first and second tubular elements of the first fork leg, the piston rod being coupled to the second tubular element of the first fork leg and extending through the seal that seals the first tubular element. In this embodiment, a damping piston is coupled to the piston rod for slidable engagement within the first tubular element of the first fork leg, a port or ports are provided, and damping fluid is disposed to flow through the port or ports (and through or around the damping piston) when the bicycle suspension is compressed or expanded. Thus, when the first fork leg comprises both a positive spring and a damping system, the piston rod may be coupled to both a compressor piston and a damping piston. The damping fluid and damping piston of this embodiment may be contained within a cartridge such as those disclosed in U.S. Pat. Nos. 5,456,480 and 5,580,075, which patents are hereby incorporated by reference in their entirety. Preferably, the "C3" cartridge currently being sold by RockShox, Inc., of San Jose, Calif., is used.

In a third embodiment of the suspension system of the present invention, a shock absorber (preferably for use as a rear shock absorber for a bicycle) comprises a first tubular element that telescopingly receives a second tubular element, such that the shock absorber may compress and expand. A compressor piston is mounted on a first end of the second tubular element and slides along the inner wall of the first tubular element when the shock absorber compresses or expands. A first biasing element is positioned between the compressor piston and the second end of the first tubular element to bias the compressor piston toward the first end of the first tubular element (tending to bias the shock absorber to undergo compression). A second biasing element is positioned between the compressor piston and the first end of the first tubular element to bias the compressor piston toward the second end of the first tubular element (tending to bias the shock absorber to undergo expansion). Preferably, the first biasing element comprises an air or other gas spring created when a first sealed chamber is formed between the second end of the first tubular element and the compressor piston, and is filled with a gas. Also preferably, the second biasing element comprises an air or other gas spring created when a second sealed chamber is formed between the first end of the first tubular element and the compressor piston, and is filled with a gas.

The shock absorber may further comprise a damping system positioned within one of the first and second tubular elements. The damping system may comprise a damping piston positioned with the second tubular element between the compressor piston and the second end of the second tubular element, at least one port for permitting fluid to flow through or around the damping piston, a damping piston rod coupled to the first tubular element and mounted on the damping piston rod such that the damping piston slides within the second tubular element when the second tubular element slides with respect to the first tubular element, and damping fluid that flows through the port or ports to damp movement of the shock absorber. The damping system may also comprise a bleed valve system.

The above and other objects, features, and advantages of the present invention will be readily apparent from the following detailed description of the invention taken in conjunction with the accompanying drawings wherein like reference characters are used to represent the like elements, the scope of the invention being set out in the appended claims.

BRIEF DESCRIPTION OF THE DRAWINGS

In the drawings:

FIG. 1 is a cross-sectional view of a suspension system utilizing at least one gas spring formed in accordance with the principles of the present invention;

FIG. 4 is an enlarged isolated cross-sectional view of the damping piston of FIG. 1;

FIG. 5 is a cross-sectional view, taken along line IV—IV of FIG. 4, of the damping piston of FIG. 4;

FIG. 8 is an enlarged isolated cross-sectional view of the suspension system of FIG. 7, taken along line VII—VII of FIG. 7;

FIG. 9 is a perspective view of a rear shock absorber for a bicycle in which the principles of the present invention are employed; and FIG. 10 is a cross-sectional view of the rear bicycle shock absorber of FIG. 9, illustrating the suspension system formed therein.

DETAILED DESCRIPTION OF THE INVENTION

Figure 2:
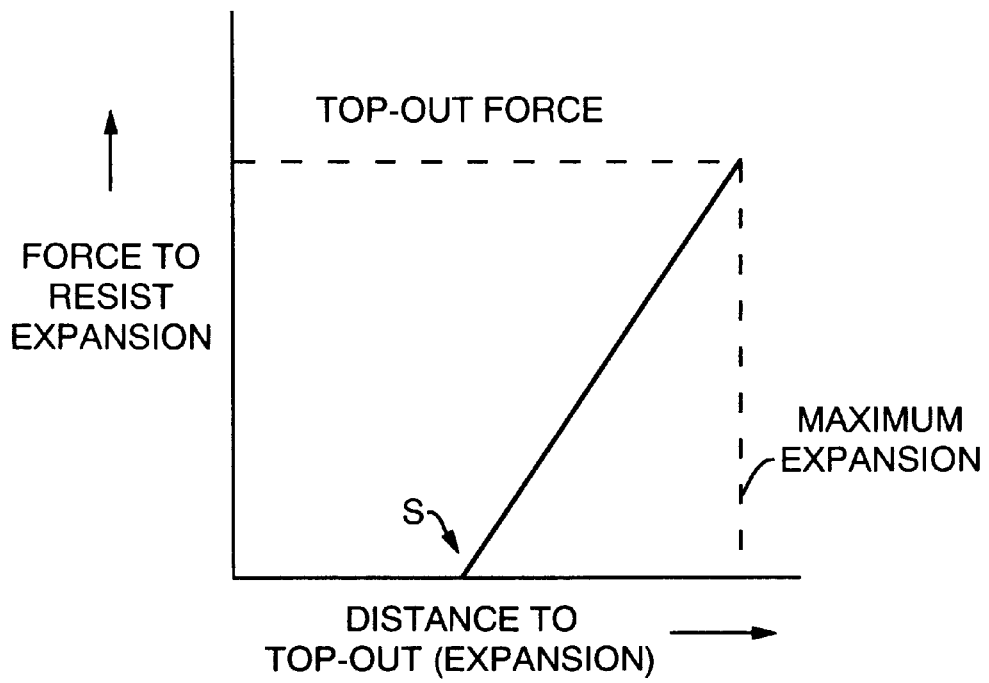
FIG. 2 is a graph illustrating suspension system extension versus force resisting extension using a prior art top-out bumper.

As one embodiment of the present invention, FIG. 1 illustrates a suspension system 10 comprising a first slidable element 12 supporting the system to be suspended, a second slidable element 14 telescopingly disposed with respect to slidable element 12 and coupled to and supported by the support for suspension system 10, and an expansion biasing element 16 which biases first and second slidable elements 12, 14 apart into a neutral configuration. In the embodiment of FIG. 1, first slidable element 12 is a tubular element and second slidable element 14 is a piston rod telescopingly slidable within tubular element 12. Preferably, piston rod 14 is concentrically positioned within tubular element 12 and aligned with longitudinal axis 11 of tubular element 12. Tubular element 12 has a first end 18 and a second end 20, and piston rod 14 likewise has a first end 22 and a second end 24. First end 22 of piston rod 14 is inserted within second end 20 of tubular element 12 and slides toward first end 18 of tubular element 12 as suspension system 10 undergoes compression. Second end 24 of piston rod 14 is coupled to a support for the suspension system 10. As applied, for example, to a vehicle, second end 24 of piston rod 14 would be coupled to the wheel of the vehicle either directly or via another element.

Preferably, first end 22 of piston rod 14 is provided with a compressor piston 26 either integrally formed therewith or coupled thereto as a separate element. Thus, as piston rod 14 telescopes into tubular element 12, compressor piston 26 interacts with expansion biasing element 16 to compress biasing element 16 during compression of suspension system 10. Following compression of suspension system 10, biasing element 16 expands to cause first end 22 of piston rod 14 to return to its initial, neutral position closer to second end 20 of tubular element 12. Such movement of piston rod 14 relative to tubular element 12 is referred to as expansion (typically movement beyond the initial neutral configuration) or rebound of suspension system 10.

In accordance with the principles of the present invention, compressor piston 26 is sealingly positioned within tubular element 12 to isolate an upper portion of tubular element 12 between first end 18 and compressor piston 26 from a lower portion of tubular element 12 between second end 20 and compressor piston 26. A sealing element 28, such as an O-ring, is provided around compressor piston 26 to provide sealing engagement of compressor piston 26 with the inner wall 30 of tubular element 12.

A seal 32 is provided adjacent second end 20 of tubular element 12. It will be understood that seal 32 may be positioned closer to, or further from, the free end 21 of tubular element 12 than shown in FIG. 1. Piston rod 14 passes through an opening 34 in seal 32 which seals against piston rod 14 such that compressor piston 26 is capable of moving closer to first end 18 of tubular element 12 without being blocked by seal 32. Compressor piston 26 and first end 22 of piston rod 14 thus are positioned on a first side 31 of seal 32 facing first end 18 of tubular element 12, and second end 24 of piston rod 14 is positioned on a second side 33 of seal 32 facing second end 20 of tubular element 12. A sealed, substantially air-tight chamber 36 is thus formed between compressor piston 26 and seal 32 and the interior of inner tubular element 12. Chamber 36 is filled with a gas, preferably air, although any other inert gas can be used to equal advantage, and thus functions as a gas spring 38 for suspension system 10.

Expansion biasing element 16 biases compressor piston 26 towards second end 20 of tubular element 12. Thus, like biasing elements within traditional suspension systems, expansion biasing element 16 generally biases the system into an expanded configuration (typically a neutral configuration in which the system is between a completely compressed configuration and a completely expanded configuration). In contrast, gas spring 38, because of its location, biases compressor piston 26 towards first end 18 of tubular element 12. Gas spring 38 accordingly functions as a compression biasing element that biases suspension system 10 into a compressed configuration. As discussed in greater detail below, expansion biasing element 16 is hereinafter referenced as a "positive" spring, and gas spring 38, which biases the system in an opposite direction, is hereinafter referenced as a "negative" spring.

It will be understood that the benefits of negative spring 38 described herein may be provided by a spring other than a gas spring, such as a coil or leaf spring or an elastomeric spring. However, the use of a gas spring provides additional benefits. For example, gas springs permit easy, independent adjustment of the spring rate of the negative spring 38. In addition, gas springs provide a progressive spring rate that may, in many instances, provide exceptional suspension performance during compression, as well as during bottom-out and top-out conditions. A valve (preferably as illustrated in FIG. 8) thus is preferably provided in fluid communication with negative spring 38 to permit adjustment of the pressure of the gas within chamber 36. This can be done in the conventional manner using a Schrader valve or other valve of a type well known to the art.

Because the force of negative spring 38 counteracts the force of positive spring 16, the combined spring rate of suspension system 10 thus is adjustable not only by modifying the spring rate of positive spring 16 (as in typical suspension systems) but also by modifying the spring rate of negative spring 38. In addition, the force provided by negative spring 38 may be adjusted to reduce the crack force of the system, or even to eliminate the crack force required to begin compressing suspension system 10.

Because of the compressive biasing provided by negative spring 38 counter to the expansive biasing of positive spring 16, negative air spring 38 also functions to reduce the "crack force" of tubular element 12 and piston rod 14 (the force necessary to initiate relative sliding motion between tubular element 12 and piston rod 14) which is determined, in part, by the biasing force of positive spring 16 of suspension system 10. Negative spring 38, as a gas spring, may be pressurized enough to significantly counteract the action of positive spring 18 biasing tubular element 12 and piston rod 14 apart into the neutral configuration. For example, if positive spring 16 provides forty pounds of expansive force to tubular element 12 and piston rod 14, a force of just over forty pounds must be applied to suspension system 10 in order for the suspension to begin working (assuming, for convenience, the absence of friction). However, if negative spring 38 provides forty pounds of compressive force to tubular element 12 and piston rod 14 (biasing elements 12 and 14 into a compressed configuration) then the effective crack force of the assembly will be zero and the system will be responsive to any amount of applied force. Thus, the crack force that typically interferes with the compression stroke of tubular element 12 and piston rod 14 is reduced by the action of negative spring 38.

Another potential function of negative spring 38 is to prevent overexpansion of suspension system 10. Seal 32, closing a portion of tubular element 12 adjacent second end 20, inhibits piston rod 14 from becoming disengaged from tubular element 12 by blocking compressor piston 26 from being withdrawn from tubular element 12. In order to prevent compressor piston 26 from suddenly impacting against seal 32 upon overexpansion, suspension systems have been provided with a top-out bumper between compressor piston 26 and seal 32, as well as in other locations, to absorb such impacts. Because negative spring 38 functions to bias tubular element 12 and piston rod 14 together, negative spring 38 is resistant to expansion of tubular element 12 and piston rod 14 apart from each other. Thus, negative spring 38 may also function as a top-out bumper as follows.

As suspension system 10 expands, first and second ends 18, 20 of tubular element 12 progressively move respectively further away from corresponding first and second ends 22, 24 of piston rod 14 such that first end 22 of piston rod 14 approaches second end 20 of tubular element 12. Thus, compressor piston 26 moves towards seal 32 and second end 20 of tubular element 12, thereby reducing the volume of chamber 36 and compressing negative spring 38. Negative spring 38, as a gas spring, and thus having a progressive spring rate, will increasingly resist expansion of tubular element 12 and piston rod 14, depending on the characteristics of the gas within chamber 36, and will prevent compressor piston 26 from contacting seal 32. Thus, negative spring 38 prevents tubular element 12 and piston rod 14 from overexpanding and separating.

Such functions are commonly performed by a top out bumper in a suspension system. However, negative spring 38, as a gas spring, provides additional benefits over previous top-out bumpers formed from coil, elastomeric or other non-gas springs. As illustrated generally in FIG. 2, top-out bumpers such as those formed from coil or elastomeric springs provide no force resisting expansion until the telescoping elements have moved apart to the near-collision point, at which the piston within the tubular element contacts the top-out bumper. At that point, S, the spring force of the top-out bumper increases rapidly, or "spikes," as shown in FIG. 2. If the suspension system with such a top-out spring is used in a vehicle, the rider may be jarred when the top-out bumper begins to take effect, and undesirable noise and structural stresses may result to the vehicle. It will be appreciated that FIG. 2 is for illustrative purposes only, and that a specific spring for a typical top-out spring would be determined by the spring constant and configuration of the material used for that bumper.

Figure 3:
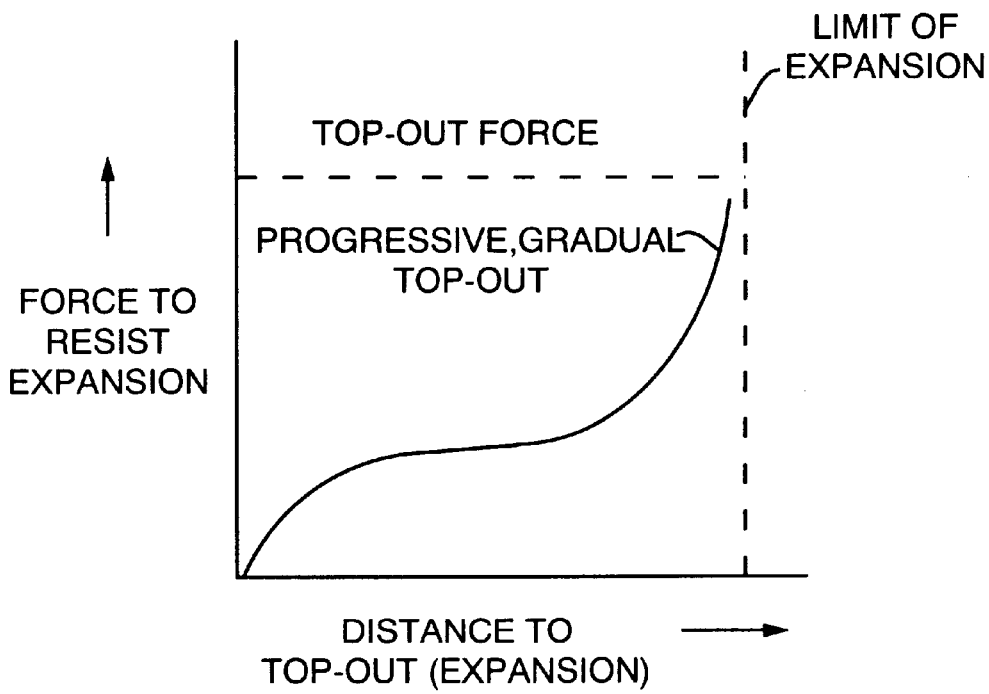
FIG. 3 is a graph illustrating suspension system extension versus force resisting extension using a gas top-out bumper in accordance with the principles of the present invention.

In contrast, because the gas that provides the compressive energy for negative spring 38 fills chamber 36 at all times, any movement of compressor piston 26 toward seal 32 will cause compression of negative spring 38. Thus, negative spring 38 does not spike, as does the top-out bumper of prior art suspension systems, but, instead, follows a more gradual, progressively increasing spring curve as shown in FIG. 3. Accordingly, the jarring effect, noise and structural impact at top-out all may be reduced or eliminated by the present invention. It should also be noted that because negative spring 38 is designed to be fully adjustable, a thin polyurethane bumper (not shown) may be added in combination with negative spring 38 for cushioning top-out impacts when negative spring 38 is insufficiently pressurized to prevent impacts.

Yet another benefit of negative spring 38 is that gas springs typically are lighter in weight than other biasing elements such as coil or elastomeric springs. In addition, although it may be preferable to do so in order to most appropriately tune the suspension system for user preferences, it is not necessary to pressurize the gas to any particular level, or to provide for adjustment of the gas pressure at all.

Positive spring 16 preferably is also formed as a gas spring. Cap assembly 50 is provided at first end 18 of tubular element 12 to provide a sealed, substantially air-tight chamber 52 above compressor piston 26 (sealed against inner wall 30 of tubular element 12 by sealing element 28 as described above) which may be filled with a desired gas 54, preferably air, although other inert gases can be used to equal advantage. The spring rate of positive spring 18 preferably is readily adjustable independently from adjustment of the negative spring 38. For this purpose, a valve 56 is preferably provided in fluid communication with chamber 52. Gas 54 within chamber 52 may be pressurized if desired to modify the spring rate of positive spring 16, and the suspension characteristics of suspension system 10, as is known in the art. As will be understood from the above, the ability to modify the spring rate of negative spring 38, in conjunction with the ability to modify the spring rate of positive spring 16, permits for greater spring rate adjustment of suspension system 10 then would be afforded by suspension systems without both positive and negative springs.

Additionally, because of its position, positive spring 16 also may function as a progressive bottom-out bumper, preventing excessive compression of tubular element 12 and piston rod 14 which would result in a harsh impact of tubular element 12 and piston rod 14 (e.g., compressor piston 26 on piston rod 14 against cap 50 on tubular element 12), or of tubular element 12 against the element supporting piston rod 14, in the absence of positive spring 16. The bottom-out bumper thus formed has a progressive resistance to compression similar to that of negative spring 38. Thus, positive spring 16, when formed as a gas spring, may function to progressively resist compression of the suspension system so that a sudden bottom-out of the sliding elements of the system is reduced or eliminated.

The embodiment of FIG. 1 preferably comprises a damping system 60 provided between compressor piston 26 and positive biasing element 16. Damping system 60 preferably includes a damping piston 62, which may be valved as shown in FIG. 1. Damping piston 62 has at least one seal, such as O-ring 64, positioned thereabout to cause piston 62 to sealingly engage inner wall 30 of tubular element 12. Damping piston 62 preferably is fixedly positioned within tubular element 12 such that damping piston 62 does not move relative to tubular element 12 during compression or expansion strokes. Tubular element 12 is filled, above compressor piston 26, with damping fluid 66, such as a conventional grade of hydraulic oil. Although the particular weight of hydraulic oil used is not important to the operation of the present invention, oils having SAE weight 2.5, 5, 8, 10, 15 or 20, for example, are readily available and may be used. It will also be appreciated that any other desired, preferably incompressible, fluid such as water, fish oil, glycerine, or a combination thereof, also may be used.

Movement of compressor piston 26 through tubular element 12 towards first end 18 of tubular element 12 (i.e., compression of suspension system 10) causes damping fluid 66 to also move towards first end 18 of tubular element 12. Damping piston 62 thus has at least one and preferably three compression ports 68, as may be seen more clearly in FIGS. 4 and 5, through which damping fluid 66 flows during compression of suspension system 10. Flow through compression ports 68 is restricted by a compression flow control element 70, such as a compression valve shim or washer. The biasing force exerted by compression shim 70 for restricting flow through ports 68 may be adjusted, in any manner known in the art, to provide the desired damping effect.

Rebound of suspension system 10 from the above-described compressed state, or expansion of suspension system 10 from a neutral configuration causes compressor piston 26 to move towards second end 20 of tubular element 12. Such movement of compressor piston 26 permits damping fluid 66 to move through damping piston 62 toward second end 20 of tubular element 12 as well. Thus, damping piston 62 also has at least one and preferably three rebound ports 72, as illustrated in FIG. 4, through which damping fluid 66 may pass during expansion or rebound of suspension system 10. Flow through rebound ports 72 is restricted by a flow control element 74 such as a rebound valve shim or washer 74. The biasing force of rebound shim 74 restricting flow through ports 72 may be adjusted in any manner known in the art. Thus, during rebound, damping fluid 66 is pushed through rebound ports 72 of damping piston 62 towards second end 20 of tubular element 12. The damping fluid that passes through damping piston 62 pushes against compressor piston 26 to move compressor piston 26 back toward second end 20 of tubular element 12. A similar series of events occurs during an expansion stroke of sliding elements 12, 14 that does not follow a compression stroke but, instead, occurs independently, such as a result of, for example, when a vehicle equipped with suspension system 10 passes over a dip in the road on which the vehicle is being driven.

It will be appreciated that movement of compressor piston 26 thus pushes damping fluid 66 through damping piston 62 against the gas filled volume within chamber 52, thereby compressing the gas 54 making up positive biasing element 16. If desired, a floating piston 76 (shown in phantom in FIG. 1) may be provided between damping fluid 66 and gas 54 as a barrier therebetween so that damping fluid 66 is not pushed directly against gas 54 within chamber 52. Alternatively, compressor piston 26 may be positioned within a damping cartridge, such as shown in above-incorporated U.S. Pat. Nos. 5,456,480 and 5,580,075, filled with damping fluid 66. If damping fluid 66 is not provided, compressor piston 26 would push directly against gas 54 of biasing element 16.

As shown in FIGS. 1 and 4, damping system 60 also is provided with a bi-directional bleed valve system 80 which permits flow of damping fluid 66 through ports 82 and 84 formed in a bleed valve shaft 86 which extends through damping piston 62 and is preferably secured thereto by a nut 87. Although port 82 is shown as radially extending and port 84 is shown as longitudinally extending, it will be appreciated that another arrangement of ports that permits flow across damping piston 62 without being controlled by flow control elements 70, 74 of valved ports 68, 72 may be provided based upon the concepts disclosed herein. Thus, low-speed fluid flow (the force of which may be too small to significantly pass flow control elements 70, 74) may pass through bleed valve system 80, whereas high-speed fluid flow is more significantly controlled by control elements 70, 74.

In order to adjust the damping effected by bleed valve system 80, a bleed adjuster shaft 88 is provided, extending through a portion of bleed valve shaft 86 adjacent port 82. Bleed adjuster shaft 88 has a flow adjustment end 90 shaped to vary the degree to which port 82 is open, thereby adjusting the amount of damping fluid 66 that can flow therethrough, depending on the relative longitudinal positions of end 90 and port 82 along longitudinal axis 11. Adjuster shaft 88 may be threadedly coupled to bleed valve shaft 86 such that rotation of adjuster knob 92 on a first end 94 of adjuster shaft 88 causes adjustment end 90 to move along longitudinal axis 11 with respect to port 82. Adjuster knob 92 preferably is accessible from outside tubular element 12 and cap assembly 50 to permit ready adjustment of the position of flow adjustment end 90 relative to port 82 to thereby adjust bleed valve damping. Thus, an opening 96 is formed in cap assembly 50 so that either first end 94 of adjuster shaft 88 or knob 92 extends through cap assembly 50. In order to maintain chamber 52 in a sealed configuration to contain gas 54 therein, a seal 98, such as an O-ring, is provided about opening 96 in cap assembly 50 through which adjuster shaft 88 or knob 92 passes.

Figure 6:
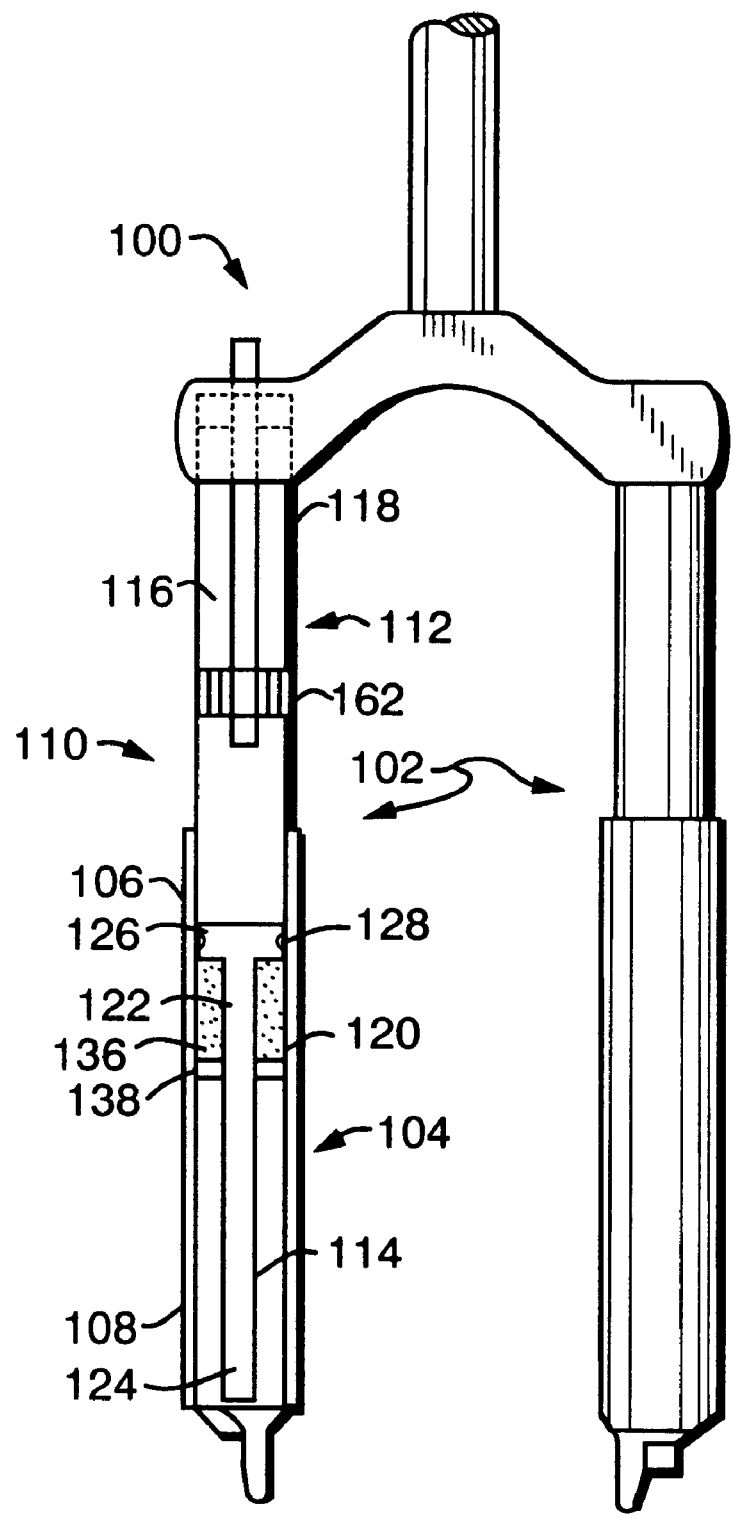
FIG. 6 is an elevational view partially in cross-section of a bicycle suspension fork housing the suspension system of FIG. 1.

The principles of the present invention may be applied to any suspension system to result in a lightweight suspension system having a highly adjustable spring rate and crack force and a smooth transition to top-out and, preferably, to bottom-out as well. For example, as shown in FIG. 6, suspension system 110 may be provided in a front bicycle suspension fork 100, within at least one of fork legs 102. Each fork leg is formed of a lower tubular element 104 and an upper tubular element 112 with a piston rod 114 extending through tubular element 104 and into tubular element 112. Tubular elements 104, 112 are arranged to slide telescopingly relative to each other. Typically, upper tubular element 112 is the inner telescoping element 112 and lower tubular element 104 is the outer telescoping element 104. However, the reverse may be true. Lower tubular element 104 has a first end 106 and a second end 108, upper tubular element 112 has a first end 118 and a second end 120, and piston rod 114 has a first end 122 and a second end 124. Second end 124 of piston rod 114 is preferably coupled to second end 108 of lower tubular element 104 and first end 122 of piston rod 114 is preferably positioned within upper tubular element 112. First end 118 of upper tubular element 112 and first end 122 of piston rod 114, move towards each other during a compression stroke. During expansion or rebound, first end 122 piston rod 114 moves toward second end 120 of upper tubular element 112.

First end 122 of piston rod 114 is provided with a compressor piston 126 which slides within upper tubular element 112. Second end 120 of upper tubular element is preferably sealed and piston 126 sealingly engages upper tubular element 112 (preferably through the use of a seal 128, such as an O-ring, positioned around piston 126) such that a sealed, substantially air-tight chamber 136 is formed between piston 126 and sealed second end 120. Chamber 136 is filled with a gas to function as a negative spring 138 similar to above-described negative spring 38 and which biases fork 100 into a compressed configuration. An expansion biasing element 116 is provided between piston 126 and first end 118 of upper tubular element 112 to counteract the compressive forces of negative spring 138 and bias fork 100 into an expanded configuration. Because spring 116 biases upper tubular element 112 into a neutral configuration and apart from piston rod 114 and lower tubular element 104, spring 116 is referenced as positive spring 116. As will be appreciated with reference to FIG. 6, the provision of lower tubular element 104 does not significantly affect the function of negative spring 138 and positive spring 116 in suspension system 110 such that system 110 functions in substantially the same manner as in the above-described system 10 of FIGS. 1, 4 and 5. Thus, compression is predominantly resisted by positive spring 116 and expansion is predominantly resisted by negative spring 138.

A damping system (not shown), similar to above described damping system 60, may also be provided to damp compression and expansion of suspension system 110, in the manner described above in connection with damping system 60. It will be appreciated that damping system 60 may instead be provided in a cartridge, such as shown in above-incorporated U.S. Pat. Nos. 5,456,480 and 5,580,075, that is formed to be fixedly positioned within inner tubular element 112, such that the cartridge telescopingly slides with inner tubular element 112 within outer tubular element 104. Thus, the damping system would be easily removable for adjustments and other desired modifications.

Figure 7:
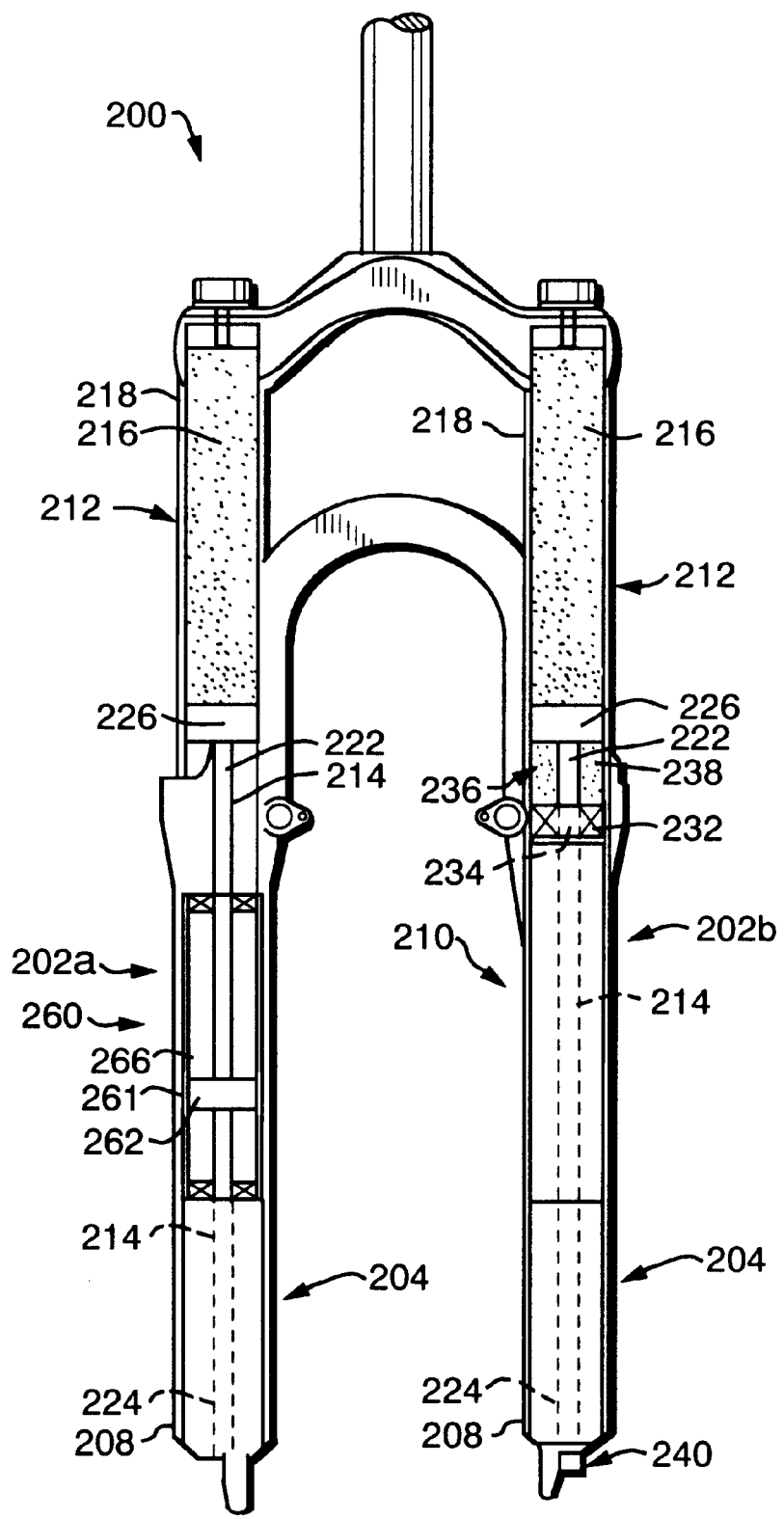
FIG. 7 is a cross-sectional elevational view of a bicycle suspension fork embodying a suspension system formed in accordance with the principles of the present invention.

Another alternative embodiment, as shown in FIG. 7, provides a damping system 260 in one leg 202a of suspension fork 200 while suspension system 210 is provided in the other leg 202b of fork 200. Each leg 202a, 202b comprises an upper tubular element 212 telescopingly slidable with respect to a lower tubular element 204. Typically upper tubular element 212 is an inner telescoping element 212 that slides within the lower tubular element 204 which thus is an outer telescoping element 204. However, the reverse may be true.

In a preferred embodiment, damping system 260 is provided as a self-contained unit having a damping cartridge 261 such as shown in above-incorporated U.S. Pat. Nos. 5,456,480 and 5,580,075. Damping piston 262, mounted on piston rod 214, and damping fluid 266 are positioned within damping cartridge 261. Because second end 224 of piston rod 214 is coupled to second end 208 of lower tubular element 204, relative movement of tubular elements 204 and 212 causes relative movement between upper tubular element 212 and piston 226 mounted on piston rod 214. Damping piston 262 is formed similar to damping piston 62 such that movement of damping piston 262 through damping cartridge 261 (and thus through damping fluid 266 therein) causes damping of movement of upper tubular element 212 with respect to piston rod 214 and lower tubular element 204.

In the embodiment of FIG. 7, piston rod 214 extends through damping cartridge 261 such that compressor piston 226, coupled to first end 222 of piston rod 214, is slidably positioned within upper tubular element 212 between damping cartridge 261 and first end 218 of upper tubular element 212. An expansion biasing element 216, preferably in the form of an air spring, is provided in at least one and preferably both of fork legs 202a, 202b between compressor piston 226 and first end 218 of upper tubular element 212. Expansion biasing element 216 functions substantially the same as positive springs 16 and 116 in biasing tubular elements 204 and 212 apart into an expanded configuration and hence is similarly referenced as a positive spring.

The arrangement of suspension system 210 in leg 202b of fork 200 in FIG. 7 is similar to that in FIG. 6. Thus, only the different elements and functions will be described. It is noted that in the embodiment of FIG. 7, a compression biasing element 238, preferably in the form of an air spring, is provided preferably only in one of fork legs 202a, 202b. Compression biasing element 238 functions substantially the same as negative springs 38 and 138 in biasing tubular elements 204 and 212 together into a compressed configuration and hence is similarly referenced as a negative spring. Instead of forming negative spring 238 between a sealed second end of upper tubular element 212 and compressor piston 226 (such as illustrated by the arrangement of suspension system 110 of FIG. 6), a seal 232, similar to seal 32 of FIG. 1, is provided to form the sealed substantially air-tight chamber 236 with compressor piston 226. Piston rod 214 extends through and is sealingly engaged with an opening 234 in seal 232 such that compressor piston 226 is positioned between seal 232 and first end 218 of upper tubular element 212. Piston rod 214 is slidable with respect to seal 232 during compression and expansion of fork 200 such that seal 232 is slidable between first and second ends 222, 224 of piston rod 214.

Although heavily dependent on rider weights, the crack force of the bicycle fork may be set to zero when both positive spring 216 and negative spring 238 comprise air springs, by setting positive spring 216 to about 65 psi to 70 psi, and negative spring 238 to about 110 psi to 120 psi. In any event, the air pressure of positive spring 216 typically will vary from about 50 psi to 100 psi, and the pressure of negative spring 238 typically will vary from about 100 psi to 200 psi.

In a preferred embodiment, chamber 236, which comprises negative spring 238, extends not only between compressor piston 226 and seal 232 but also through at least a part of piston rod 214, as may be more easily seen in the isolated enlarged view of FIG. 8. As may be appreciated with reference to FIG. 8, piston rod 214 generally has a hollow interior 215. The portion of chamber 236 within upper tubular element 212 and between compressor piston 226 and seal 232 is in fluid communication with interior 215 of piston rod 214 via at least one preferably radial opening 217 in piston rod 214. The pressure within chamber 236 may be modified using valve 240 at second end 224 of piston rod 214. Valve 240 preferably is positioned outside second end 208 of lower tubular element 204 such that valve 240 is easily accessible.

The principles of damping system 10 of the present invention may also be applied to a rear shock absorber 300 for a bicycle, as shown in FIGS. 9 and 10. Rear shock absorber 300 has a lower slidable element 304 and an upper slidable element 312, each slidable along longitudinal axis 301 of shock absorber 300. In the embodiment of FIGS. 9 and 10, lower and upper slidable elements 304, 312 are tubular elements that are telescopingly slidable with respect to each other. Preferably, lower tubular element 304 slides within upper tubular element 312, although the reverse may be true. Ii will be appreciated that, in comparison to the previously described embodiments of FIGS. 1 through 8, lower tubular element 304 may be referred to as a piston rod. Each of tubular elements 304, 312 preferably has a respective mounting element 305, 313 by which rear shock absorber 300 may be mounted between the frame and rear tire of a bicycle (not shown).

An expansion biasing element 316, such as an air spring formed within chamber 380 of upper tubular element 312, biases tubular elements 304, 312 into a spaced-apart, neutral configuration. Each of tubular elements 304, 312 has a respective first end 306, 318 and a respective second end 308, 320. When shock absorber 300 undergoes compression, first end 306 of lower tubular element approaches first end 318 of upper tubular element 312. When shock absorber 300 undergoes rebound or expansion, first end 306 of lower tubular element 304 approaches second end 320 of upper tubular element 312. A compressor piston 326 is mounted on first end 306 of lower tubular element 304 such that as shock absorber 300 undergoes compression, compressor piston 326 compresses expansion biasing element 316. Because expansion biasing element 316 resists compression, it is referenced as a positive spring. A negative spring 338 is provided between compressor piston 326 and second end 320 of upper tubular element 312 to counteract the forces of positive spring 316. Second end 320 of upper tubular element 312 is preferably sealed in any desired manner such that a sealed, substantially air-tight chamber 336 is formed between sealed second end 320 and compressor piston 326. Negative spring 338 is preferably a gas spring formed by filling sealed chamber 336 with a desired gas, preferably air (and pressurizing chamber 336, if desired), similarly to above-described negative springs 38, 138, and 238. Thus, negative spring 338 also biases tubular elements 304, 312 into a compressed configuration, resists overexpansion of tubular elements 304, 312, and may function as a top-out bumper for shock absorber 300.

The pressure of negative spring 338, and hence the spring rate of rear shock absorber 300, is adjustable using valve 324. In the embodiment of FIGS. 9 and 10, valve 324 is mounted in second end 320 of upper tubular element 312. Valve 324 communicates with chamber 336 between compressor piston 326 and second end 320 of upper tubular element 312 such that negative spring 338 may be modified. Preferably, an additional chamber 336a is formed immediately adjacent second end 320 of upper tubular element 312 and below chamber 336, supplementing primary chamber 336.

In a preferred embodiment, shock absorber 300 is provided with a damping system 360 which damps compression and rebound of shock absorber 300 as follows. A damping piston 362 is positioned within lower tubular element 304 for slidable movement therein. Damping piston 362 is formed similar to damping piston 62 with similar valving and thus the description of damping piston 62 is applicable to damping piston 362 and a more detailed description of piston 362 need not be provided. In a preferred embodiment, damping piston 362 is coupled to upper tubular element 312 by piston rod 363. Piston rod 363 is either directly coupled to first end 318 of upper tubular element 312 or coupled thereto via mounting element 313. Thus, damping piston 362 is fixed relative to upper tubular element 312 such that as lower tubular element 304 telescopes into and out of upper tubular element 312, lower tubular element 304 and damping piston 362 move with respect to each other. Piston rod 363 extends through upper tubular element 312 and into lower tubular element 304 through plug 376, having a seal 378 mounted thereon for sealing chamber 380.

At least a portion of lower tubular element 304 is filled with damping fluid 366 similar to above-described damping fluid 66. Thus, as lower tubular element 304 moves relative to upper tubular element 312, damping fluid 366 moves through damping piston 362, particularly through the valves of damping piston 362, to effect damping of rear shock 300. An adjuster shaft 388 is provided to modify damping as desired. Adjuster shaft 388 is similar to above-described adjuster shaft 88 but passes through piston rod 363 and is adjusted via a radially extending adjuster knob 392.

Damping piston 362 divides lower tubular element into a compression chamber 361C between damping piston 362 and compressor piston 326 and a rebound chamber 361R between damping piston 362 and second end 308 of lower tubular element 304. During compression, damping fluid 366 flows from rebound chamber 361R to compression chamber 361C, whereas during rebound, damping fluid 366 flows in the opposite direction. A floating piston 374 is provided within lower tubular element 304 between damping fluid 366 (filling a portion of lower tubular element 304 adjacent first end 306) and an air volume 375 (filling a portion of lower tubular element 304 adjacent second end 308). Upon compression, floating piston 374 moves toward second end 308 of lower tubular element 304 to compensate for the fluid volume displaced by piston rod 363 as it extends into chamber 361C. Thus, as damping fluid 366 is displaced from rebound chamber 361R to compression chamber 361C, fluid that cannot be accommodated by compression chamber 361C pushes against floating piston 374 so that such fluid may remain within rebound chamber 361R.

While the foregoing description and drawings represent the preferred embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. For example, it will be understood that the terms "inner" and "outer" and "upper" and "lower" have been used for the sake of simplicity, and are not intended as terms of limitation. Variations of such arrangements incorporating the basic principles of the present invention are within the scope of the present invention. One skilled in the art will appreciate that the invention may be used with many modifications of structure, arrangement, proportions, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims, and not limited to the foregoing description.

What is claimed is:

1. A suspension system, comprising:

a first tubular element in telescoping, slidable engagement with a piston rod, said first tubular element having first and second ends, said second end of said first tubular element being closed;

said piston rod extending into said first tubular element and having a first end and a second end;

a compressor piston positioned on said first end of said piston rod for slidable engagement with said first tubular element;

a first biasing element positioned between said compressor piston and said closed second end of said first tubular element and biasing said compressor piston toward said first end of said first tubular element;

a second biasing element positioned between said first end of said first tubular element and said compressor piston and biasing said compressor piston toward said second end of said first tubular element;

wherein said compressor piston is in sealing engagement with said first tubular element and isolates a first portion of said first tubular element in which said first biasing element is positioned from a second portion of said first tubular element in which said second biasing element is positioned;

said second end of said first tubular element is closed by a seal; and said first biasing element comprises a gas spring formed in a substantially air-tight chamber defined by said first tubular element, said compressor piston, and said seal.

2. A suspension system as in claim 1, wherein:

said suspension system further comprises a cap assembly sealing said first end of said first tubular element; and said second biasing element comprises a gas spring formed in a substantially air-tight chamber defined by said first tubular element, said compressor piston, and said cap assembly.

3. A suspension system as in claim 2, wherein said first biasing element is configured for resisting top-out impacts.

4. A suspension system, comprising:

a first tubular element in telescoping, slidable engagement with a piston rod, said first tubular element having first and second ends, said second end of said first tubular element being closed;

said piston rod extending into said first tubular element and having a first end and a second end;

a compressor piston positioned on said first end of said piston rod for slidable engagement with said first tubular element;

a first biasing element positioned between said compressor piston and said closed second end of said first tubular element and biasing said compressor piston toward said first end of said first tubular element;

a second biasing element positioned between said first end of said first tubular element and said compressor piston and biasing said compressor piston toward said second end of said first tubular element;

a damping system disposed within said first tubular element, said damping system damping relative movement between said first tubular element and said compressor piston;

wherein said damping system is positioned between said compressor piston and said second biasing element;

wherein said damping system comprises a damping piston fixedly positioned within said first tubular element;

a damping fluid;

at least one port to permit said damping fluid to flow past said damping piston; and at least one flow control element controlling a flow of said damping fluid through said at least one port.

5. A suspension system as in claim 4, wherein said damping system further comprises a bleed valve system.

6. A suspension system as in claim 5, wherein said bleed valve system comprises a bleed valve shaft coupled to said damping piston and having at least one port therethrough, said at least one port permitting damping fluid to flow past said damping piston.

7. A suspension system as in claim 6, wherein said bleed valve system further comprises an adjuster shaft extending through said bleed valve shaft and having a flow adjustment end positioned for adjusting the size of said at least one port through said bleed valve shaft.

8. A suspension system, comprising:

a first tubular element in telescoping, slidable engagement with a piston rod, said first tubular element having first and second ends, said second end of said first tubular element being closed;

said piston rod extending into said first tubular element and having a first end and a second end;

a compressor piston positioned on said first end of said piston rod for slidable engagement with said first tubular element;

a first biasing element positioned between said compressor piston and said closed second end of said first tubular element and biasing said compressor piston toward said first end of said first tubular element;

a second biasing element positioned between said first end of said first tubular element and said compressor piston and biasing said compressor piston toward said second end of said first tubular element;

a damping system disposed within said first tubular element, said damping system damping relative movement between said first tubular element and said compressor piston;

wherein said damping system is positioned between said compressor piston and said second biasing element;

wherein said damping system comprises:

a damping piston fixedly positioned within said first tubular element;

a damping fluid;

at least one port to permit said damping fluid to flow past said damping piston; and at least one flow control element controlling a flow of said damping fluid through said at least one port;

wherein said damping fluid is disposed within a space defined by said compressor piston and said second biasing element;

wherein said second biasing element comprises a gas spring, and a floating piston separates said damping fluid from said second biasing element.

* * * * *

US006105988C1

(12) EX PARTE REEXAMINATION CERTIFICATE (7051st)

United States Patent
Turner et al.

(10) Number: US 6,105,988 C1
(45) Certificate Issued: Sep. 8, 2009

(54) ADJUSTABLE SUSPENSION SYSTEM HAVING POSITIVE AND NEGATIVE SPRINGS

(75) Inventors: Paul H. Turner, Boulder, CO (US); Kevan L. Chu, Santa Cruz, CA (US); Robert L. Cobene, II, San Jose, CA (US)

(73) Assignee: JPMorgan Chase Bank N.A., Chicago, IL (US)

Reexamination Request:
No. 90/010,193, Jun. 16, 2008

Reexamination Certificate for:
Patent No.: 6,105,988
Issued: Aug. 22, 2000
Appl. No.: 09/018,747
Filed: Feb. 4, 1998

Related U.S. Application Data

(60) Provisional application No. 60/052,707, filed on Jul. 16, 1997.

(51) Int. Cl.
*B62K 25/08* (2006.01)

(52) U.S. Cl. ............... 280/276; 188/322.15; 188/319.1; 267/64.25; 267/64.26

(58) Field of Classification Search ............... 267/64.15, 267/64.25, 64.26
See application file for complete search history.

(56) References Cited

U.S. PATENT DOCUMENTS 4,647,025 A 3/1987 Gold

FOREIGN PATENT DOCUMENTS

JP 1977-66161 A1 6/1977

*Primary Examiner*—Matthew C. Graham

(57) ABSTRACT

A suspension system having first and second elements telescopingly engaged and being biased apart by a positive spring, such biasing being counteracted by a negative spring. In one embodiment, the positive spring and negative spring are disposed in the first element, which is in the form of a tube, and separated by a damping system, and a damping piston is fixed with respect to the first element. In another embodiment in which the suspension system comprises two legs of a bicycle suspension fork, a positive spring is disposed in both legs, and a negative spring and damping system are disposed in separate legs. In another embodiment in which the suspension system comprises a rear shock absorber for a bicycle, the negative and positive springs are disposed in a first tubular element, and a damping system is disposed in a second tubular element. The positive and negative springs preferably comprise air or other gas springs, and the negative spring preferably performs the additional function of resisting top-out impacts.

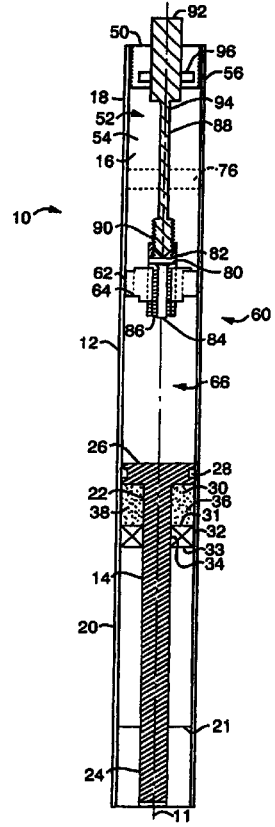

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–3 are cancelled.

Claims 4–8 were not reexamined.

* * * * *